United States Patent
Anton

(10) Patent No.: US 8,678,954 B2
(45) Date of Patent: Mar. 25, 2014

(54) METHOD USING VISUAL INDICIA FOR GOLF INSTRUCTION

(75) Inventor: Terrence P. Anton, Tahlequah, OK (US)

(73) Assignee: Snag, Inc., Tahlequah, OK (US)

( * ) Notice: Subject to any disclaimer, the term of this patent is extended or adjusted under 35 U.S.C. 154(b) by 233 days.

(21) Appl. No.: 12/902,948

(22) Filed: Oct. 12, 2010

(65) Prior Publication Data

US 2012/0088610 A1 Apr. 12, 2012

(51) Int. Cl.
*A63B 69/36* (2006.01)

(52) U.S. Cl.
USPC ............ 473/409; 473/193; 473/168; 473/407

(58) Field of Classification Search
USPC .......... 473/150, 157–189, 195, 196, 409, 193
See application file for complete search history.

(56) References Cited

U.S. PATENT DOCUMENTS

| | | | | |
|---|---|---|---|---|
| 1,832,947 A | * | 11/1931 | Sullivan et al. | 40/503 |
| 2,107,944 A | * | 2/1938 | Howard | 473/406 |
| 3,578,333 A | * | 5/1971 | Elesh | 473/171 |
| 3,601,406 A | | 8/1971 | Giusti | |
| 4,244,576 A | * | 1/1981 | Mosier et al. | 473/159 |
| 4,805,912 A | * | 2/1989 | Hickman | 473/159 |
| 5,356,134 A | * | 10/1994 | DeMatteo | 473/150 |
| 5,443,264 A | * | 8/1995 | Mehrens | 473/409 |
| 5,497,988 A | * | 3/1996 | Tolley et al. | 473/150 |
| 5,532,677 A | * | 7/1996 | Miller | 340/286.01 |
| 5,593,156 A | * | 1/1997 | Jambor | 40/584 |
| 5,630,719 A | * | 5/1997 | Franklin | 434/252 |
| 5,868,630 A | * | 2/1999 | Saksun, Jr. | 473/150 |
| 5,993,326 A | | 11/1999 | Hitchman et al. | |
| 6,575,842 B2 | * | 6/2003 | Tidwell | 473/180 |
| 6,800,034 B2 | * | 10/2004 | Burkholder | 473/174 |
| 6,884,178 B1 | | 4/2005 | Frost | |
| 6,981,921 B2 | * | 1/2006 | Scott et al. | 473/262 |
| 7,207,895 B2 | * | 4/2007 | Canakes | 473/257 |
| 7,874,930 B2 | * | 1/2011 | Hubley | 473/257 |
| 2005/0009645 A1 | * | 1/2005 | Isabell | 473/400 |
| 2007/0078022 A1 | | 4/2007 | Justice | |
| 2011/0070962 A1 | * | 3/2011 | Covino et al. | 473/174 |

\* cited by examiner

*Primary Examiner* — Mark Graham
(74) *Attorney, Agent, or Firm* — James H. Beusse; Beusse Wolter Sanks Mora & Maire, P.A.

(57) ABSTRACT

A method for using visual indicia for teaching a student proper alignment and club selection for each of a plurality of different positions of a ball for a golf type game in which the ball is struck with a club toward a target. The method includes positioning sets of markers at different distances from the target wherein each distance is chosen to represent a particular type of stroke to be made with a club. Other markers are positioned on the putting green to represent a landing spot for a ball struck from a location off of the putting green. Thereafter, directional arrows are positioned along a preferential path for a ball to travel in order to reach the target. The student is aligned with the markers and arrows to create a visual reference to associate with the striking of the ball.

18 Claims, 4 Drawing Sheets

METHOD USING VISUAL INDICIA FOR GOLF INSTRUCTION

FIELD OF THE INVENTION

The present invention relates to a method and apparatus for teaching and practicing a golf swing and, in particular, for teaching and practicing putting and a short game.

BACKGROUND OF THE INVENTION

The game of golf requires a player to swing a golf club in either a full swing or a partial swing. Most golf practice sessions involve teaching a player how to make a full swing and very little teaching is ever applied to a partial swing. Partial swings sometimes include what is generally referred to as knock-down swings but in the present application, partial swings are intended to refer to what are commonly called lob shots, pitch shots, chip shots, bunker shots and putting, all of which are part of play around a putting area and are generally referred to as the short game. Although it is recognized that the short game is critical to a good golf game, very little emphasis is placed on this portion of the game by most teachers.

SUMMARY OF THE INVENTION

The present invention is directed to a series of markers and arrows that can be used to enable a golfer to practice the short game by being able to align with the arrows and hit balls to specific target areas identified by the markers and to be able to select from among the various shots of the short game based on the distance from the target area as shown by some marker positions. Applicant has found that many golfers are visually challenged when faced with attempting to align themselves to hit a ball towards a target such as a hole on a putting green. This problem is particularly exacerbated when the ground terrain or topography includes small hills and valleys that can affect the direction and speed of a golf ball. It is difficult for the average golfer to "learn" how to aim and hit a golf ball in a direction that is not directly at the target hole on a green. More specifically, it is difficult for the average golfer to learn to read the breaks that may affect the path and distance that a ball will travel after being struck with a golf club.

In addition to the difficulty that the average golfer has in learning to read breaks, another factor that must be considered is what type of shot must be hit in order to best approach a target hole. While it is obvious that a putting stroke is desirable when the golfer is on the green or putting surface, when approaching the green the golfer may have the option of hitting different types of shots using different types of clubs. The present invention uses a series of large, moveable arrows that can be placed on the ground along a desired track for a golf ball thus enabling a golfer to align himself or herself to hit the ball along a track rather than concentrating on a target hole. Further, the present invention uses a series of markers, such as large dots or discs, that can be placed at strategic locations to indicate to the golfer the type of shot that should be played from such locations and to aid the golfer in distance perception. In one form, the markers are placed at a series of different distances from the target hole wherein each of the distances are selected to represent a boundary for selecting a particular one of the available shots to be made to the target hole. In the illustrative example, the markers are colored discs and the arrows are colored and of varying sizes. The discs are arranged at different distances from the target hole using different colors of discs to indicate to the golfer the type of shot that is to be executed within a zone defined by the discs. In this manner, the arrows and discs act as visual tracking markers that assist the golfer in accuracy and shot selection. Applicant has found that the arrows and discs aid the golfer in depth perception thereby increasing the likelihood of a successful shot. Further, applicant has found that the use of visual indicia aids the golfer in remembering or recalling instructions from a lesson.

DETAILED DESCRIPTION OF THE INVENTION

Figure 1:
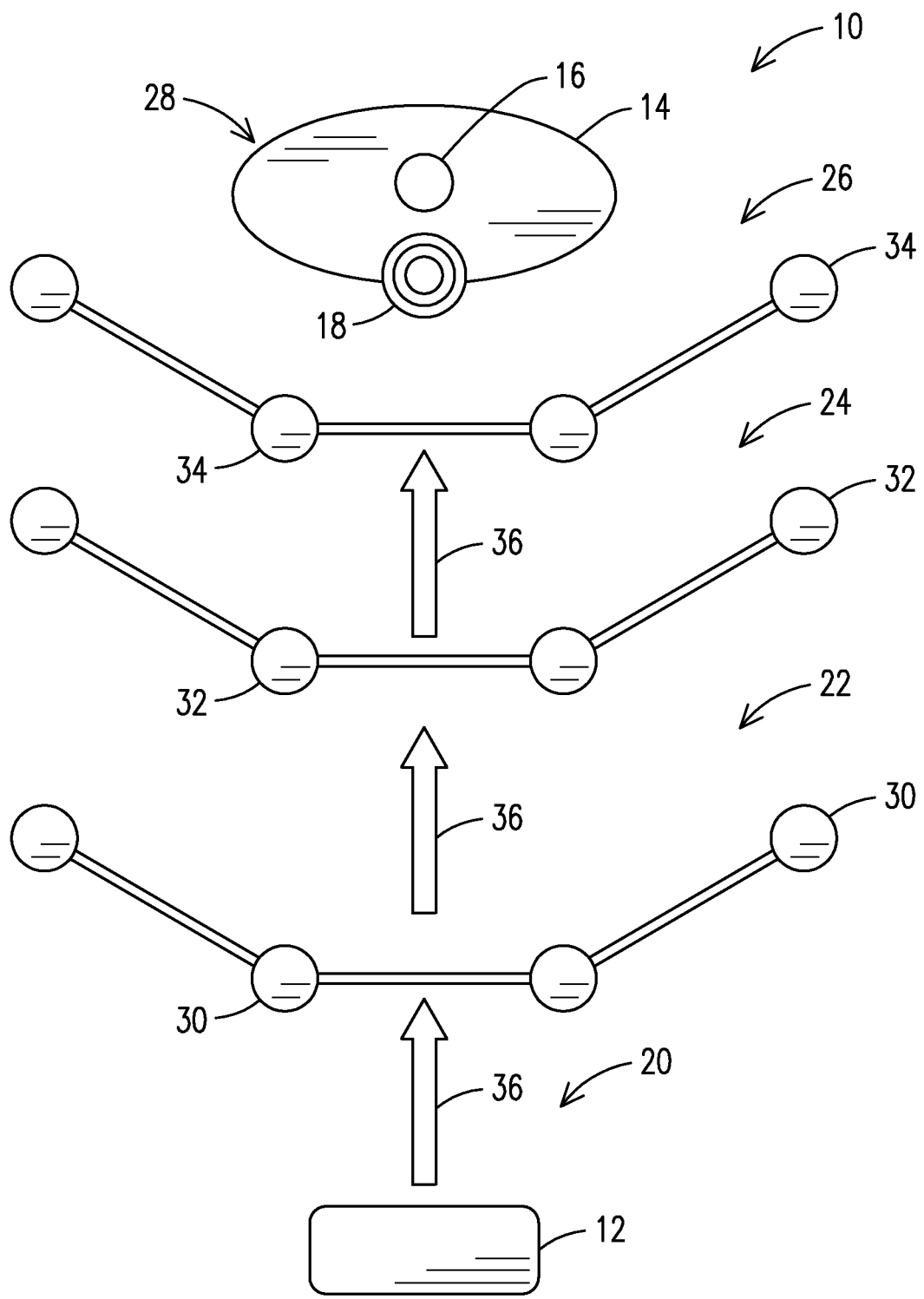
FIG. 1 is a plan view of a golf hitting area extending from a tee box to a putting surface separating into different zones using the teaching of the present invention.

Turning now to FIG. 1, there is shown one embodiment of the present invention as applied to an exemplary golfing area 10 extending from a tee box 12 (the "teeing ground") to a putting surface or putting green 14 on which is located a target such as the hole 16 or the target device 18. The area 10 extending from the tee box 12 to the green 14 is generally referred to as the fairway by most golfers and is made up of a combination of closely mown spaces and spaces of longer grass that is commonly called the rough. It is noted that the USGA Rules of Golf do not define "fairway" but simply divide each hole on a course into a teeing ground, a putting green and an area "through the green" that includes all of the area between the teeing ground and the putting green. For purpose of this description, reference to the fairway shall mean all of the area between the teeing ground and the putting green. While most golf courses have grass covered fairways, there are a number of courses that have closely mown landing areas that are bordered by sand such as courses in arid climatic regions. The present invention may be used in teaching in any of these regions.

In the present example, the fairway is divided into four zones 20, 22, 24, and 26. For ease of description, the zone 20 is defined as the teeing zone, the zone 22 is defined as the full swing zone, the zone 24 is defined as the pitching zone and the zone 26 is defined as the chipping zone. There is also a zone 28 that is located on the putting green 14 and is referred to as the putting zone. The teeing ground indicated by the tee box 12 is generally set at a distance from the putting green such that the player/golfer selects a club with which to strike or hit the golf ball with a full swing. Most golf lessons are given using a club that can be struck in this fashion. However, once the golf ball has been hit from the teeing ground, there is limited use of the full swing and more often there is a requirement for hitting the ball with a restricted swing so as to control the approach of the ball onto the putting green. The restricted swing may be either a pitch shot or a chip shot. The present invention does accommodate those situations in which a second shot is to be played toward the putting green using a full swing as indicated by the zone 22 between the first set of markers 30 and the second set of markers 32. The pitch zone 24 is indicated between the markers 32 and a third set of markers 34. Finally, the chipping zone 26 begins with the markers 34 and extends to the putting green 14. In practice, it has been found that using colored markers is helpful in learning the difference ranges for each of the zones and for this purpose, the markers 30 are preferably colored red, the markers 32 are preferably colored yellow and the markers 34 are preferably colored green. Also, while the markers 30, 32, 34 and others are shown as circular and sometimes referred to as discs, it will be recognized that the markers could have other shapes such as rectangular. The concept of the markers is to create a visual reference and the particular shape is not critical to the invention.

The markers 30, 32 and 34 are set up by a golf instructor to represent the zones within which a particular type of golf swing or stroke is to be executed. The actual distances for each stroke may vary depending on course characteristics. For the average golfer, the short game, i.e., the use of golf clubs with less than a full swing, generally starts from about 100 yards out from the putting green in a conventional golf game. In other forms of games similar to golf, such as for example, the game promoted under the name of SNAG, that distance will be substantially less even though the techniques described herein are equally applicable. For more information on SNAG, reference is made to U.S. Pat. No. 6,217,458 and to the description available on the internet at www.snaggolf.com. No matter what game is being played, the pitch and chip shots have the same basic definition. The pitch shot is in the air longer and has a short roll when it hits the ground. The chip shot has less time in the air and more roll when it hits the ground. The ratio of distance traveled in the air versus distance that the ball rolls when it hits the ground distinguishes the chip from the pitch shot. Golf instructors have routinely worked with golfers to teach the fundamentals of hitting each of these shots but applicant has found that the average golfer has difficulty in translating the practice into play particularly when it comes to selecting whether to pitch or chip. The concept of the present invention is to use visual markers that can be recalled by the golfer to simplify the process of selecting a proper approach shot to a green. Visual markers such as the colored markers used for instruction in the present invention become associated with the verbal instructions and the golfer is better able to mentally associate distance with shot selection.

Applicant has also found that the average golfer is directionally challenged when it comes to setting his/her body into an alignment for striking a ball toward a target and that this alignment becomes more difficult with distance from the target. The present invention addresses this issue using sets of arrows that can be placed along a desired target path so as to assist the golfer with aligning to this path. In FIG. 1, a set of arrows in indicated at 36. In the embodiment of FIG. 1, it is assumed that the ball will be in the air from each of the zones until striking the putting green and, accordingly, the arrows 36 are arranged in a straight line from the tee box to the putting green. In other embodiments, such as where the fairway is curved from tee box to green, the arrows may be arranged in a different line in order to assist the golfer in learning how to direct a ball in multiple shots to the putting green. In addition, the instructor may use multiple sets of arrows 36 in order to define boundaries within which each shot should be played on a golf hole.

Figures 2A, 2B:
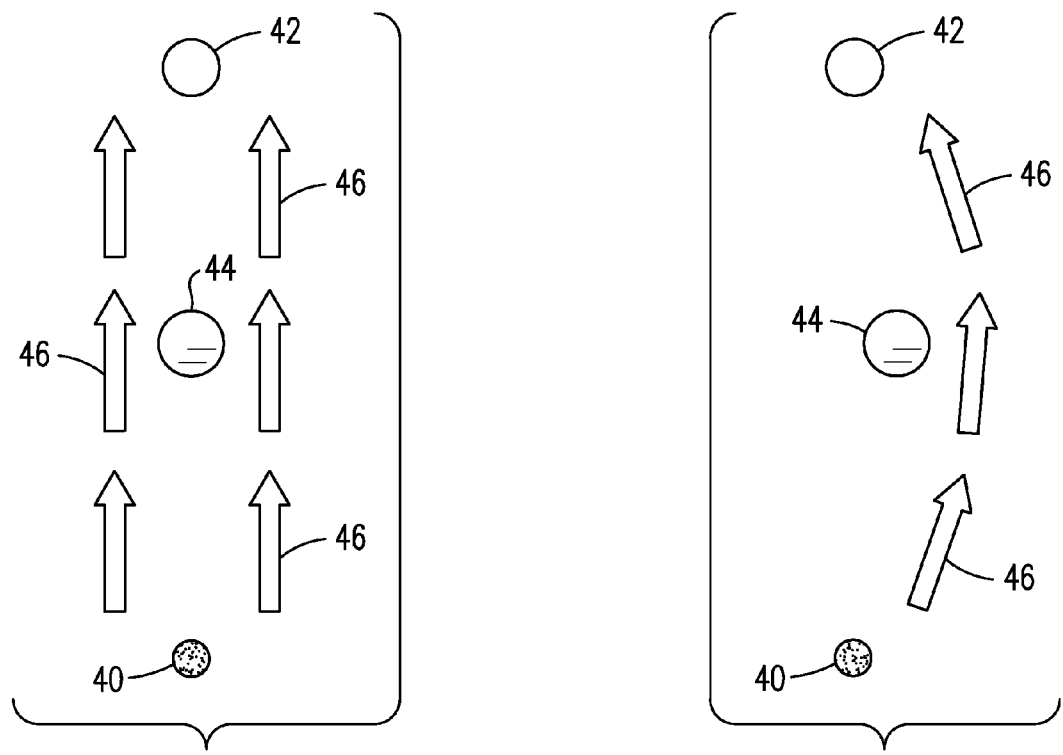
FIGS. 2A and 2B illustrate the use of arrows and markers for teaching and practicing a putting stroke.

FIGS. 2A and 2B illustrate how the directional arrows may be used in conjunction with the markers for teaching techniques for putting. FIG. 2A assumes that the putting green 14 is essentially flat so that the putt should follow a straight line from the ball location 40 to the hole location 42. For teaching purposes, a marker 44 (a "target spot") is placed between the ball location and hole to create an intermediate aiming point for the golfer. In addition, arrows 46 are placed in two parallel lines on either side of the desired track that the ball should follow when putted toward the hole 42. The arrows provide additional alignment guides for the golfer and directional indicators for the putting stroke. In FIG. 2B, the putting green 14 is assumed to have a contour that will cause a ball struck from location 40 to follow an arcuate path from the location 40 to the hole location 42. The marker 44 is placed on a desired path for the curving ball track to form the target spot for aiming of the ball. The arrows 46 are also placed on the green in a path parallel to the desired ball track in order to assist the golfer in aligning with the track and target spot. In both FIGS. 2A and 2B, the visual markers and arrows create a visual memory for the golfer that teaches the proper alignment for a putt. The marker 44 may also be used on very fast greens to teach a distance that should be used for putting the ball in order to get the ball to the hole 42 without going far beyond the hole. Thus, the system provides a visual reference for the golfer to learn both direction and distance on the putting green.

The object is to train the eyes on the exact track the ball needs to travel. This in turn stimulates the muscles to move the club head on the intended track. The small arrows set up like railroad tracks to establish a path for the ball to travel between. The markers/spots establish distance.

Figure 3:
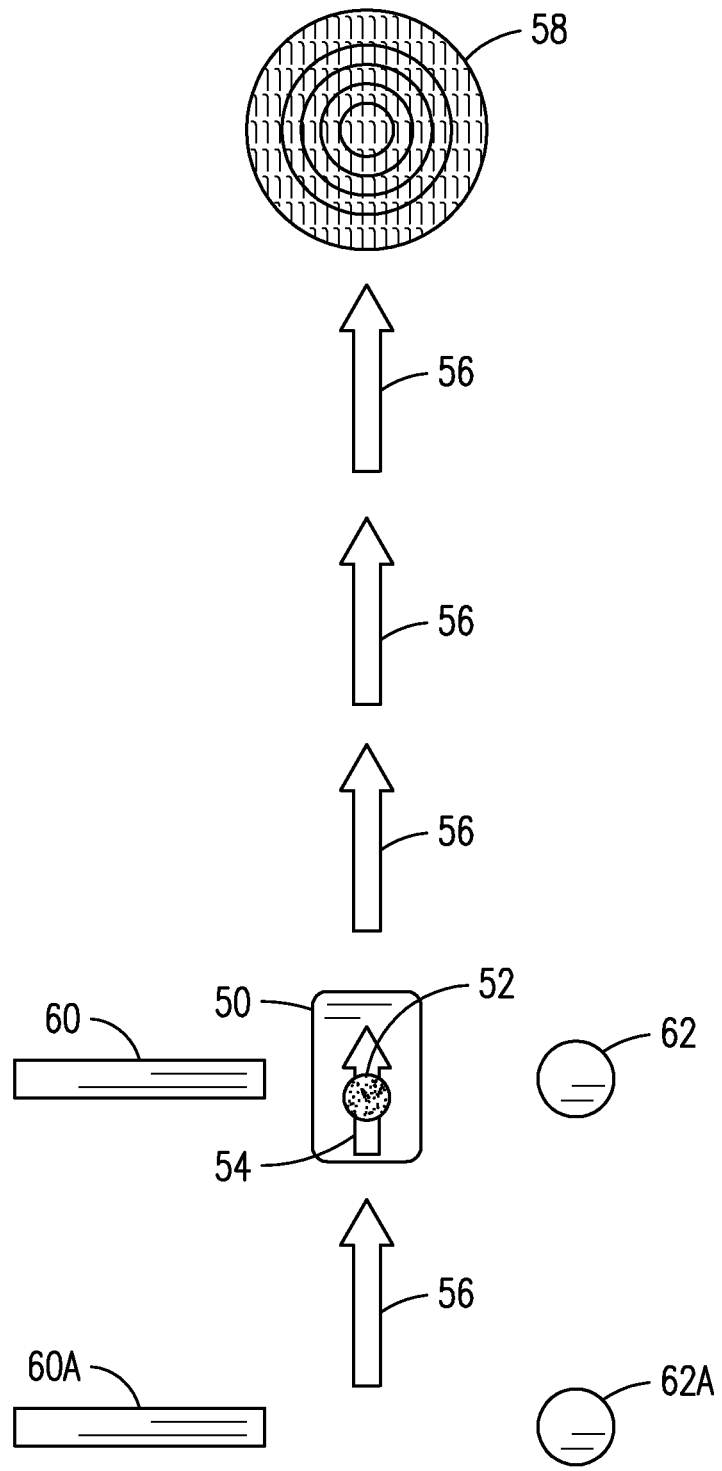
FIG. 3 illustrates the use of arrows and markers for practicing and teaching a pitch type swing of a golf club.

FIG. 3 illustrates one use of the present invention within the pitching zone 24. The pitch shot is preferably a lofted golf shot in which the ball carries relatively far in the air and travels very little when it lands. For purposes of description, reference will be made to use of the present invention in the golf like game of SNAG® golf. The SNAG ball has an outer surface that is similar to the loop material used for hook and loop fasteners and has a diameter that is slightly smaller than a tennis ball. For practice, the ball is placed on a Launch Pad™ 50 that is essentially a mat that provides a convenient flat surface for supporting a ball 52. The mat 50 includes a directional arrow 54 to assist the golfer in aligning for a golf swing. Additional arrows 56 are placed in front of and behind the Launch Pad 50 with the arrows pointing towards a target 58 such as the illustrative bullseye type target having alternating colored rings. The SNAG target is faced with hook type material so that the ball 52 will stick to the target on impact. The practice setup for the pitch shot may also include alignment markers 60 that are used to position the golfer in the preferred orientation for the pitch shot. Spot markers 62 align with the markers 60 so that the ball 52 can be consistently positioned on the mat 50. Note that the mat 50 can be moved to different positions as suggested by the additional markers 60A and 62A. As stated above, the object is to train the eyes on the exact track the ball needs to travel which stimulates the muscles to move the club head on the intended track. The large arrows in front and behind define the exact direction for ball flight.

Figure 4B:
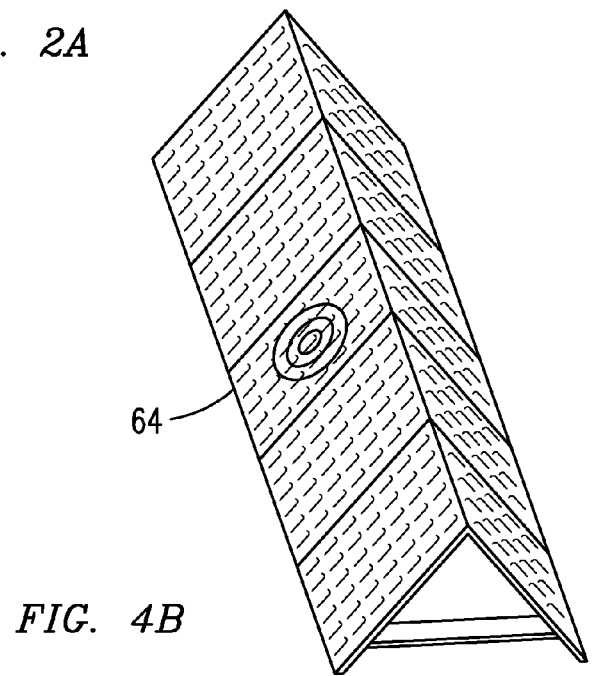
FIG. 4B is a perspective view of one form of target for use in the method illustrated in FIG. 4A.
Figure 4A:
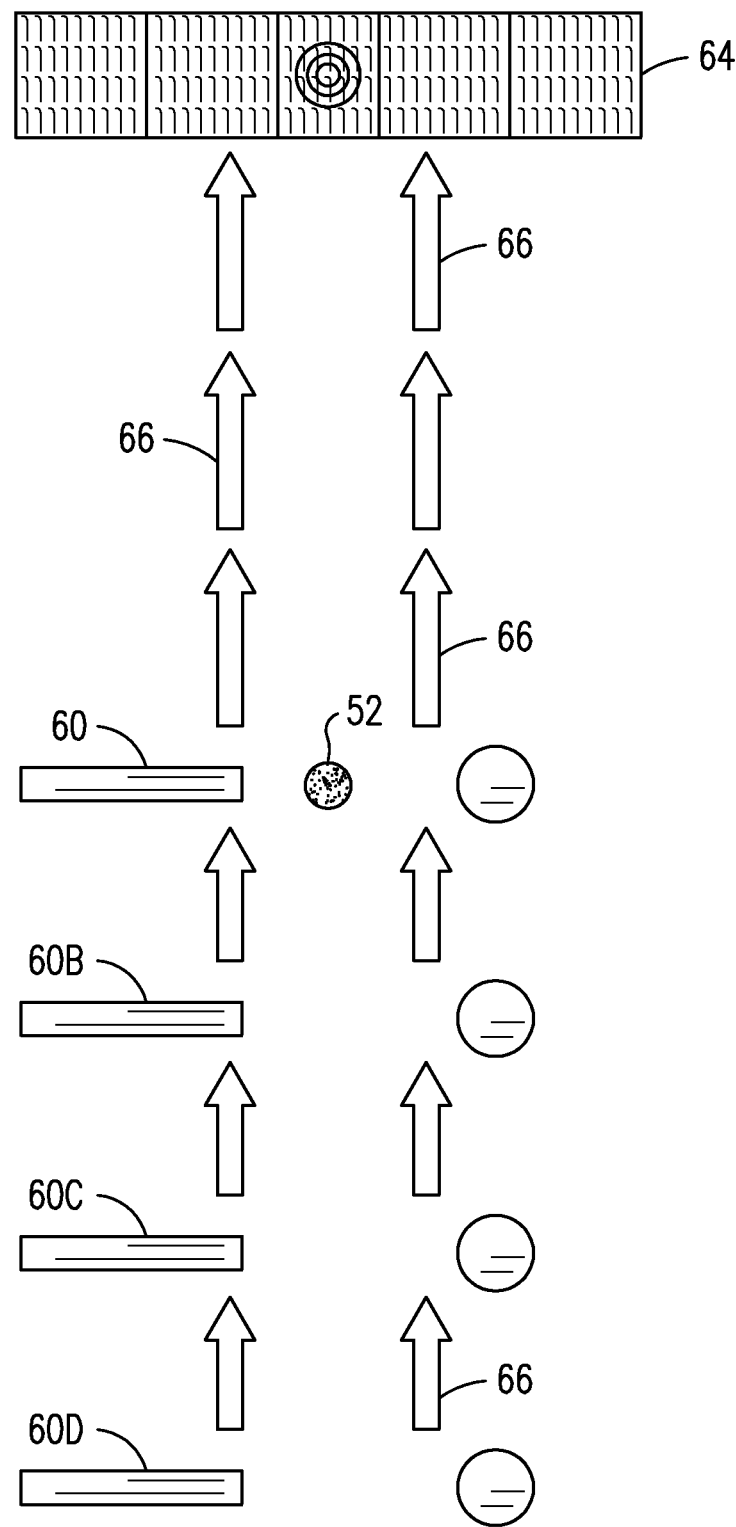
FIG. 4A illustrates an arrangement of arrows and markers for teaching and practicing putting and/or a chipping type swing of a golf club.

Still another arrangement using the present invention is shown in FIG. 4A in which the target 64 is illustrated as the Rollerama® target used in SNAG golf. The target 64 is an elongated target with different color blocks as indicated by the shading in FIG. 4A and has an outer covering material with hook type fasteners so that the ball 52 will adhere to the target upon impact. A perspective view of a Rollerama target is shown in FIG. 4B. The target 64 is triangularly shaped so that it can be placed in a desired position without using any external supports. In the arrangement of FIG. 4A, which can be used for putting or for chipping where the ball will have an extended roll on the putting green, the double row of arrows 66 is used to teach the proper alignment and stroke to direct the ball toward the target. As described in FIG. 3, markers 60 can be used to assist the golfer in positioning his/her body properly with respect to the position of the ball 52 at a selected ball striking station. Added stations for practicing the putting stroke are shown at 60B, 60C and 60D. For chipping purposes, the stations 60B, 60C and 60D may be position off the putting surface and anywhere within the chipping zone as shown in FIG. 1. If desired, the ball may be positioned on a mat such as the Launch Pad mat described in FIG. 3. As described with regard to FIG. 2B, the arrows and a marker identifying an desired landing point may be arranged to assist the student golfer in "reading" the breaks or curvature of the putting green by positioning the arrows so as to visually show the golfer what to expect of a ball rolling on the green.

What has been described is a system for providing visual references to a golfer that will help the golfer in selecting a type of shot to use in various situations on a golf course. Applicant has found that such visual references enable the golfer to better remember the lessons that have been used to teach the golf stroke and to select the better shot based on distances from a target area. The arrows provide a visual reference that also helps the golfer in recalling proper alignment for a golf shot.

What is claimed is:

1. In a golf game utilizing a ball that can be struck by a plurality of different types of golf clubs in order to propel the ball on a fairway towards a target on a putting green, a method for teaching a golfer to select a swing type based upon distance to the target objective comprising the steps of:
   defining a first zone, with placement of at least one first unique visual indicator laid on the fairway, within which the golfer should employ a chipping stroke to propel the ball toward the target, the first zone being within a first distance to the target and being defined by the first unique visual indicator;
   defining a second zone, with placement of at least one second unique visual indicator laid on the fairway, beyond the first zone within which the golfer should employ a pitch type stroke to propel the ball to the target, the second zone being within a second distance to the target and being defined by the second unique visual indicator, said second distance greater than said first distance; and
   defining a third zone, with placement of at least one third unique visual indicator laid on the fairway, beyond the second zone within which the golfer should employ a full stroke to propel the ball to the target, the third zone being within a third distance to the target and being defined by the third unique visual indicator, whereupon the golfer is taught to select a particular golf shot based on the one of the zones from which the golfer is hitting the ball, said third distance greater than said second distance;
   positioning a mat in at least one of defined zones, said mat including a directional arrow to assist the golfer in aligning a golf swing; and
   positioning additional arrows in the at least one of the defined zones behind the mat and in front of the mat, said additional arrows pointing towards the target.

2. The method of claim 1 and including positioning a plurality of directional markers on the fairway within each of the defined zones to facilitate alignment by the golfer with the target, said directional markers oriented along the surface of the fairway parallel to a direction between the ball and the target.

3. The method of claim 2 and including positioning of intermediate target markers on the putting green for identifying a landing area for each of the shots from each of the zones in order for the golf ball to reach the target.

4. The method of claim 1 and including the step of positioning a plurality of directional markers on a golf putting green aligned along an intended path of travel of a golf ball to provide a visual reference for putting of a golf ball.

5. The method of claim 4 and including the step of positioning a target marker on the putting green between a putting position and a hole as an intermediate target for controlling distance of a putt.

6. The teaching method of claim 1, in which the unique visual indicators each comprise a different one of a plurality of colors.

7. The teaching method of claim 6, in which the first zone is defined by green markers, the second zone is defined by yellow markers, and the third zone is defined by red markers.

8. The teaching method of claim 2 in which the directional markers comprise arrow shaped markers arranged to enable the golfer to align with the target.

9. The teaching method of claim 7, further comprising a step of conveying to the golfer that the green marker and the yellow marker indicate zones for selecting a restricted swing of either the chipping stroke or the pitch type stroke.

10. The teaching method of claim 1, wherein later removal of the at least one of the first unique visual indicator, the second unique visual indicator, or the third unique visual indicator from on the surface of the fairway immediately returns the surface of fairway to a condition upon which a golf game is played.

11. The teaching method of claim 1, wherein the target comprises a circular shaped bullseye target with circular colored rings.

12. The teaching method of claim 11, further comprising positioning alignment markers in the second zone to position the golfer in a preferred orientation at the target for the pitch type stroke.

13. The teaching method of claim 1, wherein the target is triangular shaped.

14. The teaching method of claim 1, further comprising determining the first distance, the second distance and the third distance based on a respective boundary to select the respective the chipping stroke, the pitch type stoke and the full stroke to be made toward the target.

15. The teaching method of claim 1, further comprising:
   providing the ball and the target, wherein an outer surface of the ball and an outer surface of the target comprise a hook and loop material such that the ball adheres to the target upon contact with the target; and
   providing a mat on a surface of one of the first zone, the second zone and the third zone, such that the ball is positioned on the mat and the ball is struck from the mat towards the target.

16. In a golf game utilizing a ball that can be struck by a plurality of different types of golf clubs in order to propel the ball towards a target on a putting green, a method for teaching a golfer to select a club and swing type based upon distance to the target comprising the steps of:
   placing a first visual indicia on top of a ground at a selected first distance from the target objective to define a first zone within which the golfer should employ a chipping stroke to propel the ball toward the target objective; and
   placing a second visual indicia on top of the ground at a second selected distance from the target greater than the first distance to define a second zone beyond the first zone within which the golfer should employ a pitch type stroke to propel the ball to the target;

positioning a mat in at least one of the defined zones, said mat including a directional arrow to assist the golfer in aligning a golf swings, and positioning additional arrows in the at least one of the defined zones behind the mat and in front of the mat, said additional arrows pointing towards the target.

17. The teaching method of claim 16, further comprising providing the ball and the target, wherein an outer surface of the ball and an outer surface of the target comprise a hook and loop material such that the ball adheres to the target upon contact with the target.

18. The teaching method of claim 16, further comprising later removing the first visual indicia or the second visual indicia from on top of the ground of the fairway so that the ground of the fairway is immediately returned to a condition upon which a golf game is played.

* * * * *